US008068677B2

(12) United States Patent
Varadarajan et al.

(10) Patent No.: US 8,068,677 B2
(45) Date of Patent: Nov. 29, 2011

(54) SYSTEM AND METHOD FOR HIERARCHICAL IMAGE PROCESSING

(75) Inventors: Sridhar Varadarajan, Bangalore (IN); Sridhar Gangadharpalli, Bangalore (IN); Adhipathi Reddy Aleti, Bangalore (IN)

(73) Assignee: Satyam Computer Services Limited, Secunderabad (IN)

( * ) Notice: Subject to any disclaimer, the term of this patent is extended or adjusted under 35 U.S.C. 154(b) by 301 days.

(21) Appl. No.: 12/547,261

(22) Filed: Aug. 25, 2009

(65) Prior Publication Data

US 2011/0055266 A1    Mar. 3, 2011

(51) Int. Cl.
*G06K 9/62* (2006.01)
(52) U.S. Cl. ........ 382/224; 382/155; 382/154; 382/173; 382/190; 707/780
(58) Field of Classification Search .................. 382/155, 382/154, 159, 190, 170, 173, 218, 224; 348/169; 706/12, 20; 707/780, 661, 737
See application file for complete search history.

(56) References Cited

U.S. PATENT DOCUMENTS

| 7,065,250 | B1* | 6/2006 | Lennon | 382/224 |
|---|---|---|---|---|
| 7,194,134 | B2* | 3/2007 | Bradshaw | 382/226 |
| 7,234,106 | B2 | 6/2007 | Simske | |
| 7,415,153 | B2 | 8/2008 | Mojsilovic | |
| 7,421,154 | B2 | 9/2008 | Kinjo | |
| 7,424,157 | B2 | 9/2008 | Pace | |
| 7,426,286 | B2 | 9/2008 | Kaneko et al. | |
| 2006/0173909 | A1 | 8/2006 | Carlson et al. | |
| 2007/0217676 | A1* | 9/2007 | Grauman et al. | 382/170 |
| 2008/0059872 | A1 | 3/2008 | Huang et al. | |
| 2009/0137924 | A1* | 5/2009 | Kapoor et al. | 600/545 |
| 2009/0157571 | A1* | 6/2009 | Smith et al. | 706/12 |
| 2009/0208106 | A1* | 8/2009 | Dunlop et al. | 382/173 |
| 2010/0046842 | A1* | 2/2010 | Conwell | 382/218 |
| 2010/0223261 | A1* | 9/2010 | Sarkar | 707/726 |
| 2011/0041080 | A1* | 2/2011 | Fleischman et al. | 715/751 |

OTHER PUBLICATIONS

Herve, Nicholas and Boujemaa, Nozha, "Image annotation: which approach for realistic databases?", Proceedings of the CIVR 2007: ACM International Conference on Image and Video Retrieval, University of Amsterdam, Amsterdam, The Netherlands, Jul. 9-11, 2007.
Le Bourne, Herve and O'Connor, Noel, "Natural scene classification and retrieval using Ridgelet-based Image Signatures", appeared in the Proceedings of the ACIVS 2005: Advanced Concepts for Intelligent Vision Systems, 7th International Conference, Antwerp, Belgium, Sep. 2-23, 2005.

(Continued)

*Primary Examiner* — Samir Ahmed
*Assistant Examiner* — Ali Bayat
(74) *Attorney, Agent, or Firm* — Merek, Blackmon & Voorhees, LLC

(57) ABSTRACT

Video processing in general and image processing in particular is a very complex process. This is more so when the analysis is required to extract information from the images for providing of the same directly or indirectly to the users. This additional complexity is due to the direct competition with users who are used to analyzing of the images both syntactically and semantically. One of the ways to contain the complexity of image analysis is to exploit the domain semantics during image processing. A system and method to help in semantics based image processing involves the identification of one or more domain relevant semantic hierarchies and using of the same during image processing.

9 Claims, 11 Drawing Sheets

OVERVIEW OF A VIDEO ANALYSIS SYSTEM

OTHER PUBLICATIONS

Murphy et al., "Using the Forest to See the Trees: A Graphical Model Relating Features, Objects, and Scenes", appeared in the Proceedings of the NIPS 2003: Neural Information Processing Systems, Vancouver, Whistler, Canada, Dec. 8-13, 2003.

Jeon et al., "Automatic Image Annotation and Retrieval using Cross-Media Relevance Models", Proceedings of the SIGIR 2003: The 26th Annual International ACM SIGIR Conference on Research and Development in Information Retrieval, Jul. 28-Aug. 1, 2003, Toronto, Canada.

* cited by examiner

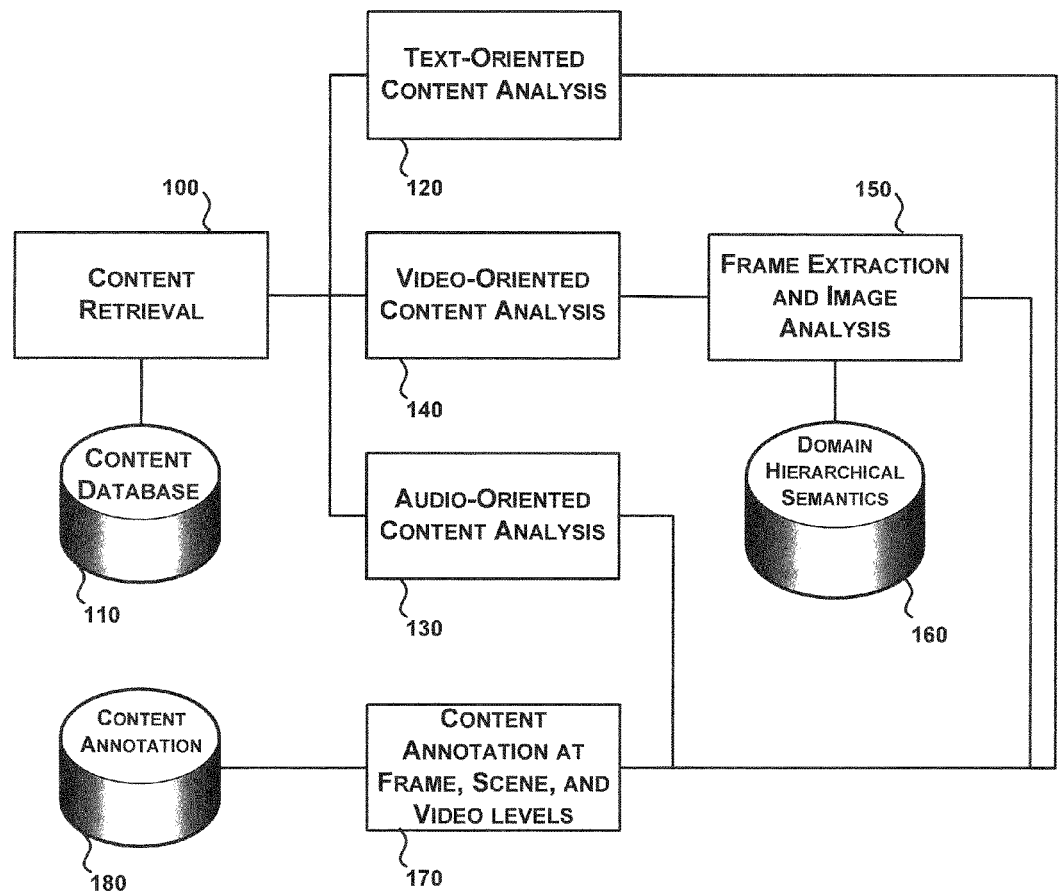
FIG. 1: OVERVIEW OF A VIDEO ANALYSIS SYSTEM

HIERARCHICAL IMAGE PROCESSING (HIP)

GIVEN A SET OF CLASSIFIERS C:
  EACH CLASSIFIER Ci OF C IS A SPECIALIST CLASSIFIER TO ANALYZE AN IMAGE TO RECOGNIZE A PARTICULAR KIND OF OBJECT IN THE IMAGE;
  Ci HAS A SEMANTIC LABEL Li;
  EACH Li HAS MULTIPLE SEMANTIC RELATIONSHIPS WITH OTHER CLASS LABELS;
  EACH Ci HAS A FEATURE VECTOR Vi THAT IS USED IN THE OBJECT RECOGNITION PROCESS;
  SUMMARIZING, EACH CLASS HAS A SEMANTIC CHARACTERIZATION AND A FEATURE VECTOR CHARACTERIZATION;
  NOTE THAT THE FEATURE VECTOR OF EACH Ci IS INDEPENDENT OF THE FEATURE VECTORS OF THE OTHER CLASSES; AND THERE IS A SEMANTIC DEPENDENCE AMONG THE SEMANTIC CHARACTERIZATION OF THE CLASS LABELS;

ONE OF THE OBJECTIVES OF HIP IS TO EXPLOIT SEMANTIC DEPENDENCE AND FEATURE INDEPENDENCE;

CLASS CHARACTERIZATION Ci: <Li, Ri, Vi> WHEREIN Li IS THE SEMANTIC LABEL OF CLASS Ci, Ri IS A SET OF SEMANTIC RELATIONSHIPS INVOLVING Li AND OTHER CLASS LABELS, AND Vi IS A FEATURE VECTOR;

C IS A SET OF CLASSES {C1, C2, ..., Ci, ...}
L IS A SET OF LABELS {L1, L2, ..., Li, ...}
V IS A SET OF FEATURE VECTORS {V1, V2, ..., Vi, ...}
R IS A SET OF SET OF SEMANTIC RELATIONSHIPS {R1, R2, ..., Ri, ...}

ILLUSTRATIVE LABELS: INDOOR, SKY, STRUCTURAL, STADIUM, ...

ILLUSTRATIVE FEATURE VECTORS: WAVELET FEATURES, MOMENT INVARIANT FEATURES, GABOR FEATURES, POGIO FEATURES, ...

ILLUSTRATIVE SEMANTIC RELATIONSHIPS: PARENT, CHILD, SIBLING, NEAR, FAR, ...

A SECOND OBJECTIVE OF HIP IS TO DETERMINE THE BEST POSSIBLE SET OF HIERARCHIES GIVEN C, L, AND R;

FIG. 2: OVERVIEW OF HIERARCHICAL IMAGE PROCESSING

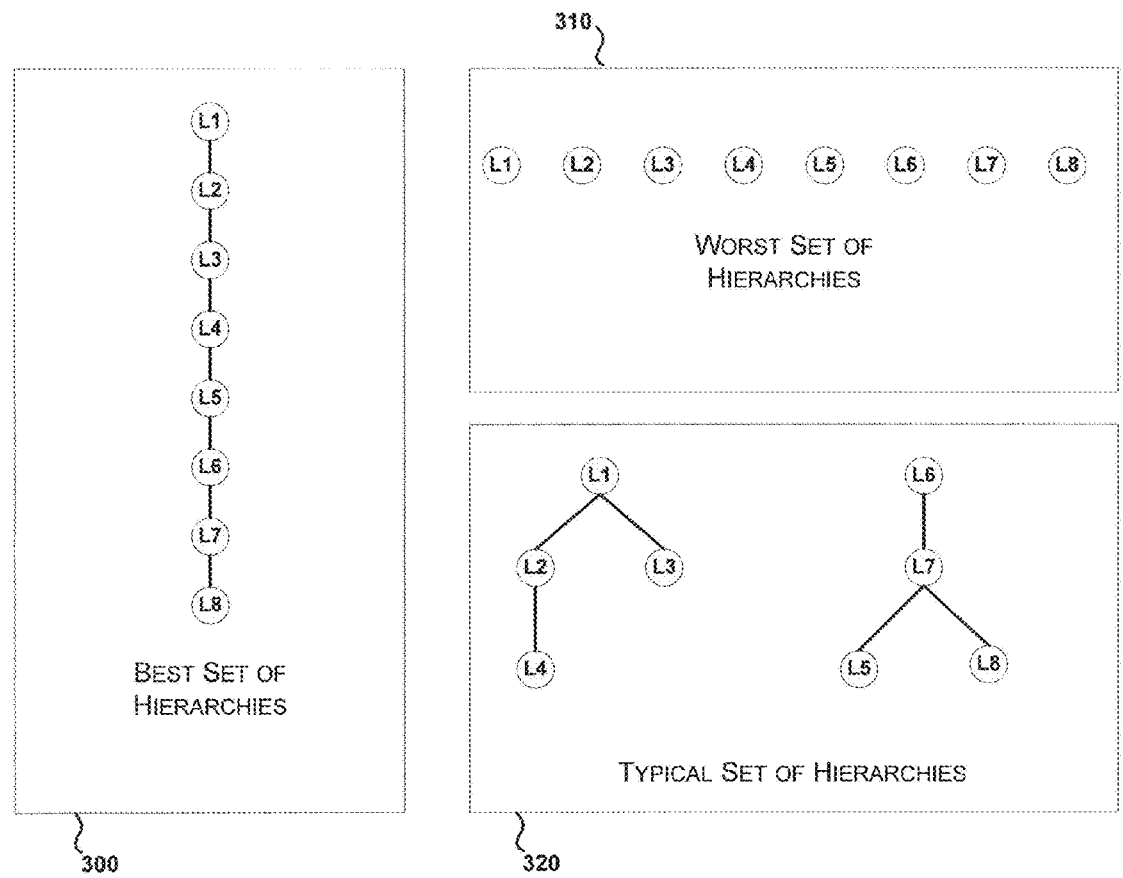
FIG. 3: ILLUSTRATIVE HIERARCHIES

HIP FACTORS

GIVEN $C = \{C1, C2, ..., Ci, ...\}$ WITH $Ci = <Li, Ri, Vi>$, AND
  $L = \{L1, L2, ..., Li, ...\}$
  $R = \{R1, R2, ..., Ri, ...\}$
  $V = \{V1, V2, ..., Vi, ...\}$

R IS BASED ON, SAY, THE FOLLOWING KINDS OF SEMANTIC RELATIONS: PARENT, CHILD, SIBLING, NEAR, AND FAR;
  LET $H = \{H1, H2, ..., Hi, ...\}$ BE THE SET OF K HIERARCHIES;

IN ORDER TO CHARACTERIZE A SET OF HIERARCHIES, THE FOLLOWING FOUR FACTORS ARE DEFINED:

(A) SIBLING FACTOR (SF): LET $S = \{S1, S2, ..., Si, ...\}$ BE THE SET OF SIBLING SETS WHEREIN $Si$ IS THE ITH SIBLING SET WITH $Ni$ AS THE NUMBER OF LABELS IN $Si$, AND $Ns$ IS THE NUMBER OF ELEMENTS IN S;
  LET N BE THE TOTAL NUMBER OF UNIQUE LABELS IN S;
  SF IS BASED ON THE NUMBER OF HIERARCHIES ACROSS WHICH SIBLINGS ARE DISTRIBUTED;
  CONSIDER $Sj$: DETERMINE $Kj$ THE NUMBER OF HIERARCHIES IN WHICH $Sj$ IS DISTRIBUTED;
  NOTE THAT $Kj = 1$ INDICATES THE ALL OF $Sj$ ARE IN ONE HIERARCHIES AND $Kj = K$ INDICATES THAT THE LABELS OF $Sj$ ARE DISTRIBUTED ACROSS ALL OF THE HIERARCHIES;

DEFINE SF AS $\text{SUM} (1<=J<=Ns) ((Kj/K) * (Nj/N))$;
  OBSERVE THAT A HIGHER VALUE OF SF IS BETTER FOR A GIVEN SET OF HIERARCHIES;

(B) REDUNDANCY FACTOR (RF): LET $N_L$ BE THE TOTAL NUMBER OF LABELS;
  LET $Mi$ BE THE NUMBER OF HIERARCHIES IN WHICH ITH LABEL IS REPLICATED; THE TYPICAL VALUE OF $Mi$ IS 1.

DEFINE RF AS $N_L/(\text{SUM} (1<=I<=N_L) Mi)$;
  THE VALUES OF RF CLOSE TO 1 IS BETTER FOR A GIVEN SET OF HIERARCHIES;

FIG. 4: HIP FACTORS

HIP FACTORS (COND.)

(C) NEAR-FAR FACTOR (NFF): IT IS REQUIRED THAT IN A GIVEN SET OF HIERARCHIES, THE LABELS THAT ARE NEAR MUST FAR FROM EACH OTHER AND THOSE THAT ARE FAR MUST BE NEAR EACH OTHER;
GIVEN L AND R, DEFINE NF(L1, L2) AS CLOSE TO 1 IF L1 AND L2 ARE SEMANTICALLY FAR FROM EACH OTHER; AND THE VALUE IS CLOSE TO 0 IF L1 AND L2 ARE SEMANTICALLY NEAR EACH OTHER;

GIVEN K HIERARCHIES, DEFINE
NFH(L1, L2) AS 1 IF L1 AND L2 ARE IN DIFFERENT HIERARCHIES;
ELSE NFH(L1, L2) = ALPHA * (DIST(L1, L2) / MAXPATHLENGTH), WHEREIN DIST(L1, L2) DENOTES THE PATH LENGTH BETWEEN L1 AND L2 IN A HIERARCHY AND MAXPATHLENGTH IS THE PATH LENGTH BETWEEN TWO LABELS THAT ARE FARTHEST FROM EACH OTHER IN THE HIERARCHY;

ALPHA IS A PRE-DEFINED VALUE WITH A TYPICAL VALUE OF 0.8;

LET P BE THE NUMBER OF POSSIBLE LABEL PAIRS;

COMPUTE NFF AS SUM (OVER ALL PAIRS LI, LJ) (|NF(LI, LJ) − NFH(LI, LJ)|) / P;
THE VALUE OF NFF CLOSE TO 1 IS BETTER FOR A GIVEN SET OF HIERARCHIES;

(D) CONFLICT FACTOR (CF): THE PREFERRED SET OF HIERARCHIES MUST HAVE MORE NUMBER OF HIERARCHIES WITH EACH HIERARCHY HAVING MORE DEPTH AND LESS BREADTH;

LET EACH LABEL HAVE AN INITIAL WEIGHT OF UNITY;
ADD UNITY TO THE WEIGHT FOR EACH LEVEL DOWN IN A HIERARCHY;
THAT IS, LET DI DENOTE THE DEPTH OF THE ITH LABEL IN A HIERARCHY;
IF A LABEL IS DUPLICATED, CONSIDER DI BASED ON THE MINIMUM OF THE DEPTHS OF THE DUPLICATED LABEL;
LET NL BE THE TOTAL NUMBER OF LABELS IN L;

COMPUTE CF AS (2 * SUM (OVER ALL LABELS) DI) / (NL*(NL−1));

NOTE THAT THE BEST CASE IS WHEN LABELS FORM A CHAIN; IN THIS CASE,
   SUM (DI) IS (NL*(NL−1))/2;
THE WORST CASE IS WHEN THE LABELS REMAIN INDEPENDENT FORMING NL SINGLE NODE HIERARCHIES; IN THIS CASE, SUM (DI) IS NL;

FIG. 4A: HIP FACTORS (CONTD.)

HIP FACTORS (CONTD.)

GIVEN A SET OF K HIERARCHIES,

COMPUTE SF, RF, NFF, AND CF BASED ON THE SET OF HIERARCHIES;

LET W1 BE THE WEIGHT ASSOCIATED WITH SF;
    W2 BE THE WEIGHT ASSOCIATED WITH RF;
    W3 BE THE WEIGHT ASSOCIATED WITH NFF; AND
    W4 BE THE WEIGHT ASSOCIATED WITH CF;

COMPUTE H-MEASURE AS W1*SF + W2*RF + W3*NFF + W4*CF;

NOTE THAT H-MEASURE OF A SET OF HIERARCHIES DEFINES THE UTILITY OF THE SET OF HIERARCHIES IN ENHANCING THE RECOGNITION ACCURACY OF A GIVEN SET OF OBJECTS IN AN INPUT IMAGE;

THE VALUE OF H-MEASURE CLOSE TO 1 INDICATES HIGHER UTILITY.

FIG. 4B: HIP FACTORS (CONTD.)

FORMATION OF HIERARCHIES

GIVEN:
   C IS A SET OF CLASSES {C1, C2, ..., Ci, ...}
   L IS A SET OF LABELS {L1, L2, ..., Li, ...}
   V IS A SET OF FEATURE VECTORS {V1, V2, ..., Vi, ...}
   R IS A SET OF SET OF SEMANTIC RELATIONSHIPS {R1, R2, ..., Ri, ...}

STEP 1:
   FORM A POPULATION OF P SETS OF HIERARCHIES BASED ON C, L, AND R, WHEREIN EACH OF
     THE P SETS HAS UP TO K HIERARCHIES AND COVERS ENTIRE OF L;
   COMPUTE H-MEASURE FOR EACH OF THE P SETS OF HIERARCHIES;

STEP 2:
   ORDER P SETS OF HIERARCHIES IN THE NON-INCREASING ORDER OF THEIR H-MEASURES;
   GET THE H-MEASURE OF THE TOP-MOST HIERARCHY SET;
   IF THERE IS NOT MUCH OF A CHANGE IN THE H-MEASURE AS COMPARED WITH A PRE-DEFINED
   NUMBER OF PAST ITERATIONS, GO TO STEP 3;
   IF NUMBER OF ITERATIONS EXCEEDS A PRE-DEFINED THRESHOLD, GO TO STEP 3;
   SELECT P/2 SETS OF HIERARCHIES AS TO BE PART OF THE NEXT POPULATION;
   RANDOMLY MUTATE THE REMAINING P/2 SETS OF HIERARCHIES BASED ON THE GENETIC
   OPERATORS:
    OPERATOR 1: DELETE A SUB-TREE IN THE HIERARCHY;
    OPERATOR 2: INSERT A SUB-TREE IN THE HIERARCHY;
    OPERATOR 3: SWAP A SUB-TREE OF ONE HIERARCHY WITH ANOTHER SUB-TREE OF
    ANOTHER HIERARCHY;
    OPERATOR 4: DELETE A HIERARCHY;
    OPERATOR 5: INSERT A HIERARCHY
   COMPUTE H-MEASURES FOR EACH OF THE P/2 MUTATED SETS OF HIERARCHIES;
   ADD THESE P/2 SETS OF HIERARCHIES TO THE ORIGINAL P/2 SETS OF HIERARCHIES;
   GO TO STEP 2;

STEP 3:
   SELECT THE SET OF HIERARCHIES IN THE TOP OF THE ORDER AS THE FORMED HIERARCHIES
   FOR IMAGE PROCESSING;
   END;

FIG. 5: AN APPROACH FOR HIERARCHY FORMATION

```
HIERARCHICAL IMAGE PROCESSING:

GIVEN:
  AN INPUT IMAGE I;
  A SET OF K FORMED HIERARCHIES;

WITH RESPECT TO EACH HIERARCHY H,
   TRAVERSE DOWN FROM THE ROOT;

STEP 1:
   AT EACH NODE, APPLY THE ASSOCIATED CLASSIFIERS;
   FOR EACH ASSOCIATED CLASSIFIER,
     OBTAIN THE RECOGNITION ACCURACY;
     UPDATE THE NODE WITH THE OBTAINED ACCURACY;
     IF THE OBTAINED ACCURACY EXCEEDS A PRE-DEFINED THRESHOLD,
        MARK THE CORRESPONDING CHILD NODE FOR FURTHER TRAVERSAL;
   IF NO MORE NODES REMAIN FOR TRAVERSAL, GO TO STEP 2;
   GO TO STEP 1;

STEP 2:
WITH RESPECT TO EACH HIERARCHY H,
   TRAVERSE DOWN FROM THE ROOT;
   WITH RESPECT TO EACH NODE,
     IF THE ASSOCIATED ACCURACY EXCEEDS A PRE-DEFINED THRESHOLD,
        ADD THE ASSOCIATED LABEL TO THE SET OF IMAGE ANNOTATIONS ASSOCIATED WITH H;

STEP 3:
OBTAIN THE SET OF SET OF IMAGE ANNOTATIONS ASSOCIATED WITH THE VARIOUS HIERARCHIES;
IDENTIFY A MAXIMAL CONSISTENT SUBSET AND FORM THE ANNOTATIONS FOR THE INPUT IMAGE;
```

FIG. 6: AN APPROACH FOR HIP

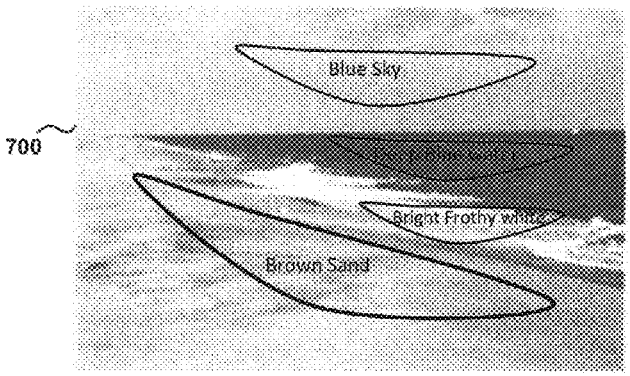

| Class ID | Label | Classifiers |
|---|---|---|
| 1 | Image | C-Day; C-Night; |
| 2 | Day | C-Indoor; C-Outdoor; |
| 3 | Outdoor | C-NaturalEnvironment; C-ManmadeEnvironment; |
| 4 | Natural-Environment | C-NaturalBlue; C-NaturalGreen; C-OtherColors; |
| 5 | Natiral-Blue | C-WaterBodies; C-Sky; |
| 6 | Natiral-Green | C-Grass; C-Trees; |
| 7 | Other Colors | C-Snow+Sand; C-Rock+Hills; C-Road+Concrete; |
| 8 | Water Bodies | C-NaturalWaterBodies; C-ManmadeWaterBodies; |
| 9 | Sky | C-CloudySky; C-NormalSky; |
| 10 | Grass | C-GrassLand; C-Park; |
| 11 | Tree | C-Forest; C-Garden; |
| 12 | Snow + Sand | C-Snow; C-Sand; |
| 13 | Rock + Hills | C-Rock; C-Hills; |
| 14 | Natural Water Bodies | C-River; C-SeaShore; |
| 15 | Manmade Water Bodies | C-Pool |

FIG. 7: ILLUSTRATIVE RESULTS

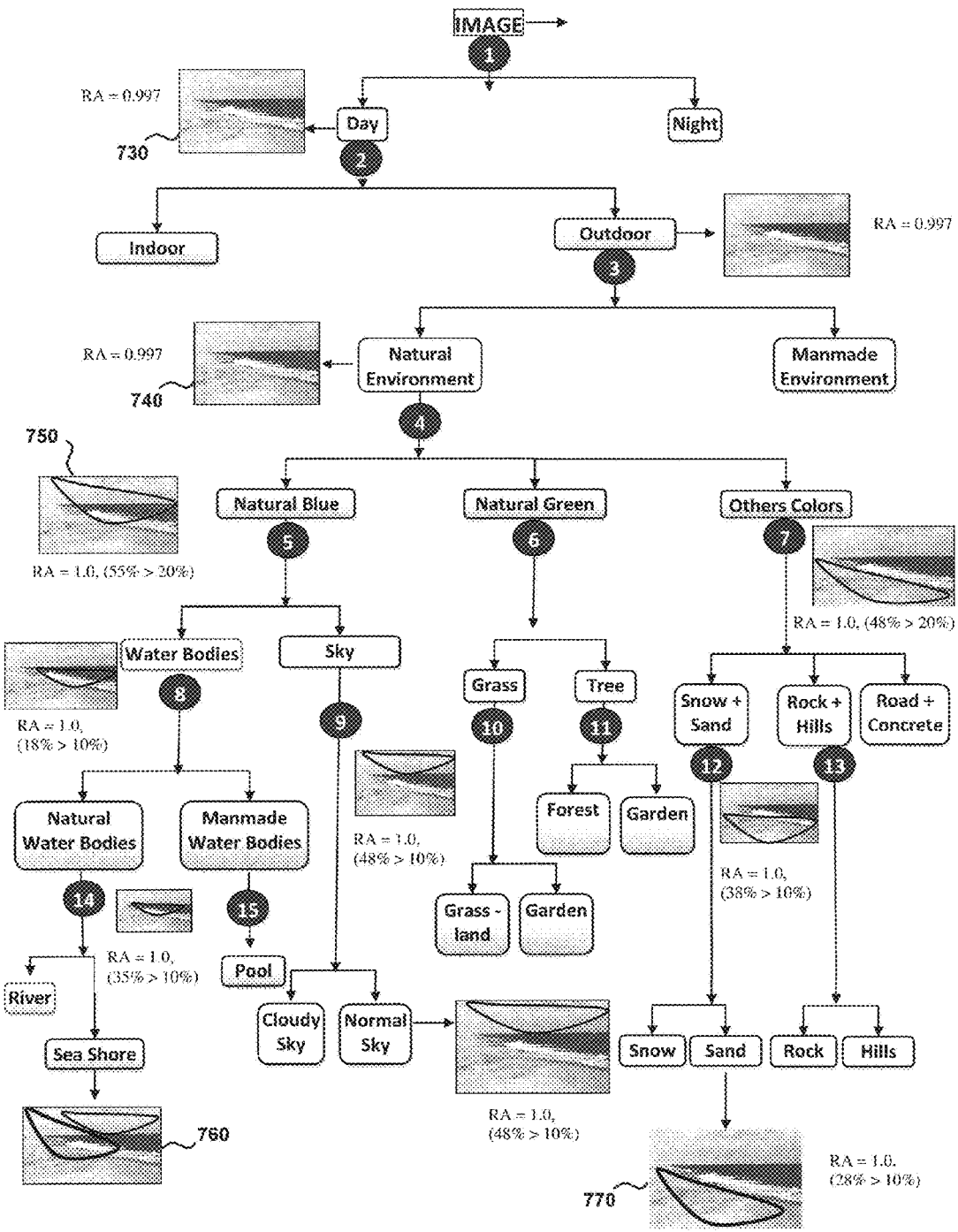
FIG. 7A: ILLUSTRATIVE RESULTS (CONTD.)

790

IMAGE ANNOTATION

DAY
  OUTDOOR
  NATURAL ENVIRONMENT
  NATURAL BLUE
  WATER BODIES
  SKY
  NATURAL WATER BODIES
  SEA SHORE
  NORMAL SKY
  SAND

NOTE THAT SOME OF THE CLASS LABELS MAY NOT GET DIRECTLY USED IN THE IMAGE ANNOTATION PROCESS

FIG. 7B: ILLUSTRATIVE RESULTS (CONTD.)

SYSTEM AND METHOD FOR HIERARCHICAL IMAGE PROCESSING

FIELD OF THE INVENTION

The present invention relates to video processing in general, and more particularly, image processing of images that are part of a video. Still more particularly, the present invention is related to a system and method for semantics based image processing that enhances the overall accuracy of image analysis.

BACKGROUND OF THE INVENTION

Video analysis of, say, a movie typically involves analyzing of a sequence of images contained in the video. The analysis is performed different points of view such as analysis for image/video compression, analysis for image/video annotation, or analysis for spam detection. As can be observed, one kind of video/image analysis is for machine processing while the other kind of video/image analysis is for providing information directly or indirectly to users. Note that video/image compression falls into the first kind while the video/image annotation is of second kind. For example, video/image annotations help in supporting semantics based end user queries on videos and relevance based ad targeting while watching the videos. For a successful annotation of an image, it is necessary to undertake the semantic analysis of the image: the image is analyzed to identify the prominent objects in the image so as provide that annotation based on these recognized objects. Note that both object recognition and identification of prominent objects are a complex and error prone processes there by leading to the not-so-very accurate image annotation. One approach to contain this complexity and enhance the accuracy of image annotation is to exploit the domain semantics during image processing.

DESCRIPTION OF RELATED ART

U.S. Pat. No. 7,426,286 to Kaneko; Toshimitsu (Yokohama, JP), Hori; Osamu (Yokohama, JP), Mita; Takeshi (Yokohama, JP), Yamamoto; Koji (Yokohama, JP) for "Method of describing object region data, apparatus for generating object region data, video processing apparatus and video processing method" (issued on Sep. 16, 2008 and assigned to Kabushiki Kaisha Toshiba (Kawasaki-shi, JP)) provides a region data describing method for describing, over a plurality of frames, region data about the region of an arbitrary object in a video, the method specifying the object region in the video with at least either of an approximate figure approximating the region or characteristic points of the region, approximating a trajectory obtained by arranging position data of the representative points or the characteristic point in a direction in which frames proceed with a predetermined function and describing the parameter of the function as region data.

U.S. Pat. No. 7,424,157 to Pace; Charles Paul (North Chittenden, Vt.) for "Apparatus and method for processing image data" (issued on Sep. 9, 2008 and assigned to Euclid Discoveries, LLC (Concord, Mass.)) provides a representation of video data that can be used to assess agreement between the data and a fitting model for a particular parameterization of the data. This allows the comparison of different parameterization techniques and the selection of the optimum one for continued video processing of the particular data.

U.S. Pat. No. 7,421,154 to Kinjo; Naoto (Kanagawa, JP) for "Image processing method" (issued on Sep. 2, 2008 and assigned to FUJIFILM Corporation (Tokyo, JP)) describes an image searching method that extracts or recognizes specific information for an image that exists in the image which can be used during image searching.

U.S. Pat. No. 7,415,153 to Mojsilovic; Aleksandra (New York, N.Y.) for "Color naming, color categorization and describing color composition of images" (issued on Aug. 19, 2008 and assigned to International Business Machines Corporation (Armonk, N.Y.)) provides methods, systems and apparatus for assigning color names to individual image pixels, and generating verbal description of color composition in images, suitable for a wide variety of information processing applications.

U.S. Pat. No. 7,234,106 to Simske; Steven J. (Fort Collins, Colo.) for "System for and method of generating image annotation information" (issued on Jun. 19, 2007) describes a system for and method of generating image annotation information comprising selecting images to be annotated, analyzing said selected images to identify associated information, generating annotation information from at least one of said selected images using said associated information, and annotating said selected images with the annotation information.

U.S. Pat. Appln. 20080059872 by Tseng; Shin-Mu; (Tainan City, TW); Huang; Jhih-Hong; (Liuying Shiang, TW); Su; Ja-Hwung; (Qiaotou Shiang, TW) entitled "Video annotation method by integrating visual features and frequent patterns" (published on Mar. 6, 2008 and assigned to National Cheng Kung University (Tainan City, TW)) describes a video annotation method by integrating visual features and frequent patterns.

U.S. Pat. Appln. 20060173909 by Carlson; Gerard J.; (Boise, Id.); Ritzenthaler; David; (Boise, Id.) entitled "Automated image annotation" (published on Aug. 3, 2006 and assigned to Hewlett Packard Company (Fort Collins, Colo.)) describes an automatic annotation transmission device that is programmed with information related to a nearby photographic subject, and configured to transmit the information to a properly configured automatic annotation reception device. An electronic image capture device is configured to receive information from an automatic annotation transmission device, correlate the annotation information with one or more captured images and store the annotation information in a memory.

"Image annotation: which approach for realistic databases?" by Herve; Nicolas and Boujemaa; Nozha (appeared in the Proceedings of the CIVR 2007: ACM International Conference on Image and Video Retrieval, University of Amsterdam, Amsterdam, The Netherlands, Jul. 9-11 2007) describes an efficient approach to image annotation based on homogeneous global image descriptors and a pool of support vector machines.

"Natural scene classification and retrieval using Ridgelet-based Image Signatures" by Borgne; Herve Le and O'Connor; Noel (appeared in the Proceedings of the ACIVS 2005: Advanced Concepts for Intelligent Vision Systems, 7th International Conference, Antwerp, Belgium, Sep. 20-23, 2005) describes a method based on ridgelet representation by defining both global and local signatures that are specifically designed for semantic classification and content based retrieval.

"Using the Forest to See the Trees: A Graphical Model Relating Features, Objects, and Scenes" by Murphy; Kevin, Torralba; Antonio, and Freeman; William (appeared in the Proceedings of the NIPS 2003: Neural Information Processing Systems, Vancouver, Whistler, Canada, Dec. 8-13, 2003)

proposes to use the scene context (image as a whole) as an extra source of (global) information to help resolve local ambiguities.

"Automatic Image Annotation and Retrieval using Cross-Media Relevance Models" by Jeon; J., Lavrenko; V., and Manmatha; R. (appeared in the Proceedings of SIGIR 2003: The 26th Annual International ACM SIGIR Conference on Research and Development in Information Retrieval, Jul. 28-Aug. 1, 2003, Toronto, Canada) describes an automatic approach to annotating and retrieving images based on a training set of images. It is assumed that regions in an image can be described using a small vocabulary of blobs and the blobs are generated from image features using clustering.

The known systems perform syntactic and semantic analyses of the images in an isolated manner to address the issues related to the processing complexity. The present invention provides a system and method to enhance the overall image recognition accuracy by building on top of the well known proposed systems by exploiting the hierarchical domain semantics.

SUMMARY OF THE INVENTION

The primary objective of the invention is to enhance the accuracy of recognition of a set of objects possibly present in an image.

One aspect of the invention is to exploit the well known classifiers for the objects under consideration. That is, use of a best suited classifier for the recognition of an object for each of the objects.

Another aspect of the invention is to use the semantic relationships among the labels of the set of classifiers associated with the set of objects.

Yet another aspect of the invention is to form a set of hierarchies of classifiers based on the semantic relationships among the labels of the classifiers.

Another aspect of the invention is to define a plurality of factors for identifying an optimal set of hierarchies.

Yet another aspect of the invention is to use a near optimal set of hierarchies to perform hierarchical image processing of an input image.

BRIEF DESCRIPTION OF THE DRAWINGS

FIG. 1 depicts an overview of a video analysis system.

FIG. 2 provides an overview of hierarchical image processing.

FIG. 3 depicts illustrative hierarchies.

FIG. 4 provides illustrative hierarchical image processing (HIP) factors.

FIG. 4a provides additional HIP factors.

FIG. 4b provides an illustrative measure of a set of hierarchies.

FIG. 5 depicts an approach for hierarchy formation.

FIG. 6 provides an approach for hierarchical image processing.

FIG. 7 depicts illustrative results of HIP.

FIG. 7a depicts additional illustrative results of HIP.

FIG. 7b depicts further additional illustrative results of HIP.

DETAILED DESCRIPTION OF THE PREFERRED EMBODIMENTS

Image processing is a complex process especially when the processing requirements are to identify the objects present in an input image. It is an open problem to identify all the objects that are present in the input image at a level of granularity that is of significant interest to human beings. A way to contain the image processing complexity at one level is not to look for all the objects present in the input image: just look for whether the objects of interest are present in the input image or not. A lot of work has gone on to build classifiers, each one of which is specialized to recognize an object of interest, say, a building, an airport, or a beach. The second level of image processing complexity reduction is to use these classifiers by identifying a hierarchical relationship among these classifiers. The third level of complexity reduction is achieved when the image processing is performed using the identified hierarchies: this step not only leads to the reduction in computational complexity but also enhances the overall object recognition accuracy. A theoretical result based on Bayes theorem indeed supports this fact.

FIG. 1 depicts an overview of a video analysis system. A content retrieval system (100) obtains a content to be annotated from the content database (110). The content is typically a multimedia video and a multi-modal analysis is performed to extract as much of information as possible with an end objective of annotating of the content. Text-oriented analysis (120) obtains the textual information that is part of the content and as much of possible information is extracted to provide one dimension to the annotation. Note that textual processing is relatively easier (although it posses its own challenges) as compared with video-oriented and audio-oriented analyses. Audio processing (130) processes both speech and non-speech sounds to obtain the information for annotation. Video-oriented analysis (140) involves analyzing of the sequence of frames that are part of the content. Such frames are extracted and a hierarchical image processing is performed (150) based on the database of domain hierarchical semantics (160). Finally, the content is annotated based on the text-oriented, video-oriented, and audio-oriented analyses at the level of granularity of interest (170), and the annotations are stored in a database (180).

FIG. 2 provides an overview of Hierarchical Image Processing (HIP).

Given a set of classifiers C:
    Each classifier Ci of C is a specialist classifier to analyze an image to recognize a particular kind of object in the image;
    Ci has a semantic label Li;
    Each Li has multiple semantic relationships with other class labels;
    Each Ci has a feature vector Vi that is used in the object recognition process;
    Summarizing, each class has a semantic characterization and a feature vector characterization;
    Note that the feature vector of each Ci is independent of the feature vectors of the other classes; And there is a semantic dependence among the semantic characterization of the class labels;
    One of the objectives of HIP is to exploit semantic dependence and feature independence;
    Class characterization Ci: <Li, Ri, Vi> wherein
Li is the semantic label of class Ci,
Ri is a set of semantic relationships involving Li and other class labels, and
Vi is a feature vector;
    C is a set of classes {C1, C2, ..., Ci, ...}
    L is a set of labels {L1, L2, ..., Li, ...}
    V is a set of feature vectors {V1, V2, Vi, ...}
    R is a set of set of semantic relationships {R1, R2, Ri, ...}
    Illustrative labels: Indoor, Sky, Structural, Stadium, ....

Illustrative feature vectors: Wavelet features, Moment invariant features, Gabor features, Pogio features, . . . .
Illustrative semantic relationships: Parent, Child, Sibling, Near, Far, . . . .
A second objective of HIP is to determine the best possible set of hierarchies given C, L, and R;

FIG. 3 depicts illustrative hierarchies. 300 depicts the best possible set of hierarchies wherein all the class labels are so tightly related resulting in a single chain. On the other hand, 310 depicts a worst case scenario: there is absolutely no relationship among the class labels. The result of using disparate classes is the there is nothing much gained to improve upon computational and recognition efficiency. Finally, 320 depicts a typical set of hierarchies.

FIG. 4 provides illustrative hierarchical image processing (HIP) factors.
Given C={C1, C2, Ci, . . . } with Ci=<LI, Ri, Vi>, and L={L1, L2, . . . , Li, . . . }
R={R1, R2, . . . , Ri, . . . }
V={V1, V2, . . . , Vi, . . . }
R is based on, say, the following kinds of semantic relations: Parent, Child, Sibling, Near, and Far;
Let H={H1, H2, . . . , Hi, . . . } be the set of K hierarchies;
In order to characterize a set of hierarchies, the following four factors are defined:
(A) Sibling Factor (SF): Let. S={S1, S2, . . . , Si, . . . } be the set of sibling sets wherein Si is the Ith sibling set with Ni as the number of labels in Si, and Ns is the number of elements in S;
Let N be the total number of unique labels in S;
SF is based on the number of hierarchies across which siblings are distributed;
Consider Sj: Determine Kj the number of hierarchies in which Sj is distributed;
Note that Kj=1 indicates the all of Sj are in one hierarchies and Kj=K indicates that the labels of Sj are distributed across all of the hierarchies;
Define SF as Sum(1<=J<=Ns)((Kj/K)*(Nj/N));
Observe that a higher value of SF is better for a given set of hierarchies;
(B) Redundancy Factor (RF): Let NI be the total number of Labels;
Let Mi be the number of hierarchies in which Ith label is replicated; The typical value of Mi is 1.
Define RF as NI/(Sum(1<=I<=NI)Mi);
The values of RF close to 1 are better for a given set of hierarchies;
FIG. 4a provides additional HIP factors.
(C) Near-Far Factor (NFF): It is required that in a given set of hierarchies, the labels that are near must far from each other; and those that are far must be near each other;
Given L and R, define NF(L1, L2) as close to 1 if L1 and L2 are semantically far from each other; and the value is close to 0 if L1 and L2 are semantically near each other;
Given K hierarchies, define
NFH(L1, L2) as 1 if L1 and L2 are in different hierarchies;
Else NFH-L1, L2)=Alpha*(Dist(L1, L2)/MaxPathLength),
wherein, Dist(L1, L2) denotes the path length between L1 and L2 in a hierarchy and MaxPathLength is the path length between two labels that are farthest from each other in the hierarchy;
Alpha is a pre-defined value with a typical value of 0.8;
Let P be the number of possible label pairs;
Compute NFF as Sum (Over all pairs Li, Lj) (INF(Li, Lj)–NFH(Li, Lj)|)/P;
The value of NFF close to 1 is better for a given set of hierarchies;
(D) Conflict Factor (CF): The preferred set of hierarchies must have more number of hierarchies with each hierarchy having more depth and less breadth:
Let each label have an initial weight of unity;
Add unity to the weight for each level down in a hierarchy;
That is, Let Di denote the depth of the Ith label in a hierarchy;
If a label is duplicated, consider Di based on the minimum of the depths of the duplicated label;
Let NI be the total number of labels in L;
Compute CF as (2*Sum(Over all labels)Di)/(NI*(NI–1));
Note that the best case is when labels form a chain; In this case, Sum (Di) is (NI*(NI–1))/2;
The worst case is when the labels remain independent forming NI single node hierarchies; In this case, Sum (Di) is NI;
FIG. 4b provides an illustrative measure of a set of hierarchies.
Given a set of K hierarchies,
Compute SF, RF, NFF, and CF based on the set of hierarchies;
Let W1 be the weight associated with SF;
W2 be the weight associated with RF;
W3 be the weight associated with NFF; and
W4 be the weight associated with CF;
Compute H-Measure as W1*SF+W2*RF+W3*NFF+W4*CF;
Note that H-Measure of a set of hierarchies defines the utility of the set of hierarchies in enhancing the recognition accuracy of a given set of objects in an input image. The value of H-Measure close to 1 indicates higher utility.

FIG. 5 depicts an approach for hierarchy formation. The formation of hierarchies involves the identification of a near optimal set of hierarchies and one approach is based on the use of a stochastic optimization technique such as genetic algorithms.
Given:
C is a set of classes {C1, C2, . . . , Ci, . . . }
L is a set of labels {L1, L2, . . . , Li, . . . }
V is a set of feature vectors {V1, V2, . . . , Vi, . . . }
R is a set of set of semantic relationships {R1, R2, . . . , Ri, . . . }
Step 1:
Form a population of P sets of hierarchies based on C, L, and R, wherein each of the P sets has up to K hierarchies and covers entire of L;
Compute H-Measure for each of the P sets of hierarchies;
Step 2:
Order P sets of hierarchies in the non-increasing order of their H-Measures;
Get the H-Measure of the top-most hierarchy set;
If there is not much of a change in the H-Measure as compared with a pre-defined number of past iterations, Go To Step 3;
If number of iterations exceeds a pre-defined threshold, Go To Step 3;
Select P/2 sets of hierarchies as to be part of the next population;
Randomly mutate the remaining P/2 sets of hierarchies based on the genetic operators:
Operator 1: Delete a sub-tree in the hierarchy;

Operator 2: insert a sub-tree in the hierarchy;
Operator 3: Swap a sub-tree of one hierarchy with another sub-tree of another hierarchy;
Operator 4: Delete a hierarchy;
Operator 5: Insert a hierarchy
Compute H-Measures for each of the P/2 mutated sets of hierarchies;
Add these P/2 sets of hierarchies to the original P/2 sets of hierarchies;
Go To Step 2;
Step 3:
Select the set of hierarchies in the top of the order as the Formed Hierarchies for Image Processing;
End;

FIG. 6 provides an approach for hierarchical image processing.

Hierarchical Image processing:
Given:
An input Image I;
A set of K Formed Hierarchies;
With respect to each hierarchy H,
Traverse down from the root;
Step 1:
At each node, apply the associated classifiers;
For each associated classifier,
  Obtain the recognition accuracy;
  Update the node with the obtained accuracy;
  If the obtained accuracy exceeds a pre-defined threshold,
    Mark the corresponding child node for further traversal;
If no more nodes remain for traversal, Go to Step 2:
Go to Step 1;
Step 2:
With respect to each hierarchy H,
Traverse down from the root;
With respect to each node,
  If the associated accuracy exceeds a pre-defined threshold,
    Add the associated label to the set of Image annotations associated with H;
Step 3:
Obtain the set of set of image annotations associated with the various hierarchies;
Identify a maximal consistent subset and form the annotations for the input image.

Note that a maximal consistent subset of image annotations is a largest subset of annotations based on the set of set of image annotations and R, the set of set of semantic relationships.

FIG. 7 depicts illustrative results of HIP. 700 depicts an input image and is obtained from the web source: http://gimp-savvy.com/PHOTO-ARCHIVE The objective is to perform HIP on this input image to identify the various of the objects of interest.

710 provides a table depicting the class hierarchy. Note that this class hierarchy is based on semantic relationships among the labels associated with the classes. Each node in the hierarchy has a Class ID and is bound with one or more classifiers. For example, Class ID 1 is bound with two classifiers: C-Day and C-Night. C-Day is a specialist classifier to analyze an input image to recognize whether the input image is a day time image. Similarly, the other classifiers are also specialist classifiers. In particular, note that most of the classifiers may have some sort of pre-processing, say regionalization, as part of their classification process. Further, as part of the post-processing in some of the classifiers, the context, say, as defined by the path in the hierarchy, gets used in reducing the ambiguity, and thereby enhancing the recognition accuracy. Observer this aspect in the C-SeaShore classifier.

FIG. 7a depicts additional illustrative results of HIP. In particular, the figure depicts an illustrative classifier hierarchy that is used in an experiment to demonstrate the utility of HIP. The input image is analyzed using the various classifiers associated with the various nodes in the hierarchy and a brief description is as follows:

Step 1: Initially, the image is analyzed by using two classifiers: C-Day and C-Night; the recognition accuracy obtained using C-Day is 0.997 (730) leading to the traversal of the hierarchy through node 2.

Step 2: Two more classifiers are used in the analysis: C-Indoor and C-Outdoor; the recognition accuracy obtained with C-Outdoor is 0.997 leading to the traversal through node 3.

Step 3: Further analysis is performed using the two classifiers: C-NaturalEnvironment and C-ManmadeEnvironment; the recognition accuracy obtained with C-NaturalEnvironment is 0.997 (740).

Step 4: Analysis is performed at node 4 using the three classifiers, C-NaturalBlue, C-NaturalGreen, and C-OtherColors; The recognition accuracy obtained with C-NaturalBlue is 1.0 based on the fact that the obtained percentage measure is much greater than a pre-defined threshold (750); Similarly, the recognition accuracy obtained with C-OtherColors is 1.0.

Step 5: Analysis is performed at node 5 using the two classifiers, C-WaterBodies and C-Sky leading to the identification of "Sea Shore" (760) and "Normal Sky;"

Step 6: Similarly, the analysis at node 7 leads to the identification of "Sand" (770).

FIG. 7b depicts further additional illustrative results of HIP. The image gets annotated based on the recognition accuracy obtained by the various classifiers that are part of the classifier hierarchy. 790 depicts the annotations of the input image. Note that some of the class labels may not get directly used in the annotation process.

Thus, a system and method for hierarchical image processing is disclosed. Although the present invention has been described particularly with reference to the figures, it will be apparent to one of the ordinary skill in the art that the present invention may appear in any number of systems that need to exploit the hierarchical semantics in order to improve the performance. It is further contemplated that many changes and modifications may be made by one of ordinary skill in the art without departing from the spirit and scope of the present invention.

What is claimed is:

1. A method for improving the recognition accuracy of a plurality of objects possibly contained in an image by performing hierarchical image processing to determine a plurality of image annotations of said image, wherein said method comprising:
    obtaining of a plurality of classifiers, wherein each of said plurality of classifiers is associated with an object of said plurality of objects;
    obtaining of a plurality of feature vectors, wherein each of said plurality of feature vectors is associated with a class of said plurality of classifiers;
    obtaining of a plurality of labels, wherein each of said plurality of labels is associated with a classifier of said plurality of classifiers;
    obtaining of a plurality of plurality of semantic relationships, wherein each of said plurality of plurality of semantic relationships is associated with a label of said plurality of labels;

computing of a plurality of factors associated with a plurality of hierarchies, wherein each of said plurality of hierarchies is based on said plurality of plurality of semantic relationships;

computing of a hierarchy measure for said plurality of hierarchies;

determining of a plurality of formed hierarchies based on said plurality of classifiers, said plurality of labels, and said plurality of plurality of semantic relationships;

analyzing of said image based on said plurality of formed hierarchies resulting in a plurality of plurality of hierarchical annotations; and performing of consistency analysis based on said plurality of plurality of hierarchical annotations resulting in said plurality of image annotations.

2. The method of claim 1, wherein said method of computing of said plurality of factors further comprising:

determining of a plurality of sibling sets based on said plurality of labels, a sibling relationship among said plurality of labels, and said plurality of plurality of semantic relationships, wherein each of said plurality of sibling sets is a plurality of siblings.

determining of a total number of elements in said plurality of sibling sets;

determining of a total number of hierarchies in said plurality of hierarchies;

determining of a plurality of number of hierarchies, wherein each of said plurality of number of hierarchies is based on the number of hierarchies across which a plurality of siblings of a sibling set of said plurality of sibling sets is distributed;

determining of a plurality of number of elements, wherein each of said plurality of number of elements is based on a sibling set of said plurality of sibling sets;

computing of a sibling factor of said plurality of factors based on said total number of elements, said total number of hierarchies; said plurality of number of hierarchies, and said plurality of number of elements.

3. The method of claim 2, wherein said method further comprising:

determining of a total number of labels in said plurality of labels;

determining of a plurality of number of hierarchies, wherein each of said plurality of number of hierarchies is based on the number of hierarchies across which a label of said plurality of labels is distributed; and computing of a redundancy factor of said plurality factors based on said total number of labels and said plurality of number of hierarchies.

4. The method of claim 2, wherein said method further comprising:

obtaining of a total number of pairs based on said plurality of labels;

determining of a plurality of near-far values, wherein each of said plurality of near-far values is based on a near-far relationship among said plurality of labels, said plurality of plurality of semantic relationships, and a pair of labels, wherein each of said pair of labels is part of said plurality of labels;

determining of a plurality of near-far hierarchical values, wherein each of said plurality of near-far hierarchical values is based on a pair of labels, wherein each of said pair of labels is part of said plurality of labels, the distance between said pair of labels based on said plurality of hierarchies, and a plurality of maximum path lengths, wherein each of said plurality of maximum path lengths is associated with a hierarchy of said plurality of hierarchies; and computing of a near-far factor of said plurality of factors based on said plurality of near-far values, said plurality of near-far hierarchical values, and said total number of pairs.

5. The method of claim 2, wherein said method further comprising:

determining of a total number of labels in said plurality of labels;

determining of a plurality of depths, wherein each of said plurality of depths is associated with a depth of a label based on said plurality of hierarchies;

computing of a conflict factor of said plurality of factors based on said total number of labels and said plurality of depths.

6. The method of claim 1, wherein said method of computing of said hierarchy measure further comprising:

computing of a sibling factor based on said plurality of hierarchies;

computing of a redundancy factor based on said plurality of hierarchies;

computing of a near-far factor based on said plurality of hierarchies;

computing of a conflict factor based on said plurality of hierarchies;

obtaining of a weight 1 associated with said sibling factor of said plurality of factors;

obtaining of a weight 2 associated with said redundancy factor of said plurality of factors;

obtaining of a weight 3 associated with said near-far factor of said plurality of factors;

obtaining of a weight 4 associated with said conflict factor of said plurality of factors; and computing of said hierarchy measure based on said sibling factor, said weight 1, said redundancy factor, said weight 2, said near-far factor, said weight 3, said conflict factor, and said weight 4.

7. The method of claim 1, wherein said method of determining further comprising:

randomly forming of a plurality of hierarchy sets, wherein each of said plurality of hierarchy sets is a plurality of hierarchies based on said plurality of labels and said plurality of plurality of semantic relationships;

computing of a plurality of hierarchy measures, wherein each of said plurality of hierarchy measures is associated with a hierarchy set of said plurality of hierarchy sets; and applying of a stochastic optimization technique based on said plurality of hierarchy sets and said plurality of hierarchy measures to determine said plurality of formed hierarchies.

8. The method of claim 1, wherein said method of analyzing further comprising:

obtaining of a formed hierarchy of said plurality of formed hierarchies;

obtaining of a node of said formed hierarchy wherein said node is marked for traversal;

obtaining of a plurality of classifiers associated with said node;

applying of each of said plurality of classifiers with respect to said image resulting in a plurality of recognition accuracies;

obtaining of a recognition accuracy of said plurality of accuracies, wherein said recognition accuracy is associated with a classifier of said plurality of classifiers and said recognition accuracy exceeds a pre-defined threshold;

obtaining of a child node of said formed hierarchy associated with said classifier;

marking of said child node for traversal;

obtaining of a label associated with child node; and making of said label part of a plurality of hierarchical annotations of said plurality of plurality of hierarchical annotations, wherein said plurality of hierarchical annotations is associated with said formed hierarchy.

9. The method of claim 1, wherein said method of performing further comprising:

obtaining of a plurality of hierarchical annotations of said plurality of plurality of hierarchical annotations;

forming of a plurality of plurality of consistent annotations based on said plurality of hierarchical annotations, said plurality of plurality of hierarchical annotations, and said plurality of plurality of semantic relationships;

selecting a plurality of maximal consistent annotations based on said plurality of plurality of consistent annotations, wherein said plurality of maximal consistent annotations is maximal among said plurality of plurality of consistent annotations; and making of said plurality of maximal consistent annotations as said plurality of image annotations.

* * * * *